May 4, 1948.   R. BIRMANN   2,440,890
TURBINE BEARING
Filed Jan. 3, 1941   2 Sheets-Sheet 1

WITNESS:
Rob't A. Kitchel.

INVENTOR
Rudolph Birmann
BY
Busser & Harding
ATTORNEYS.

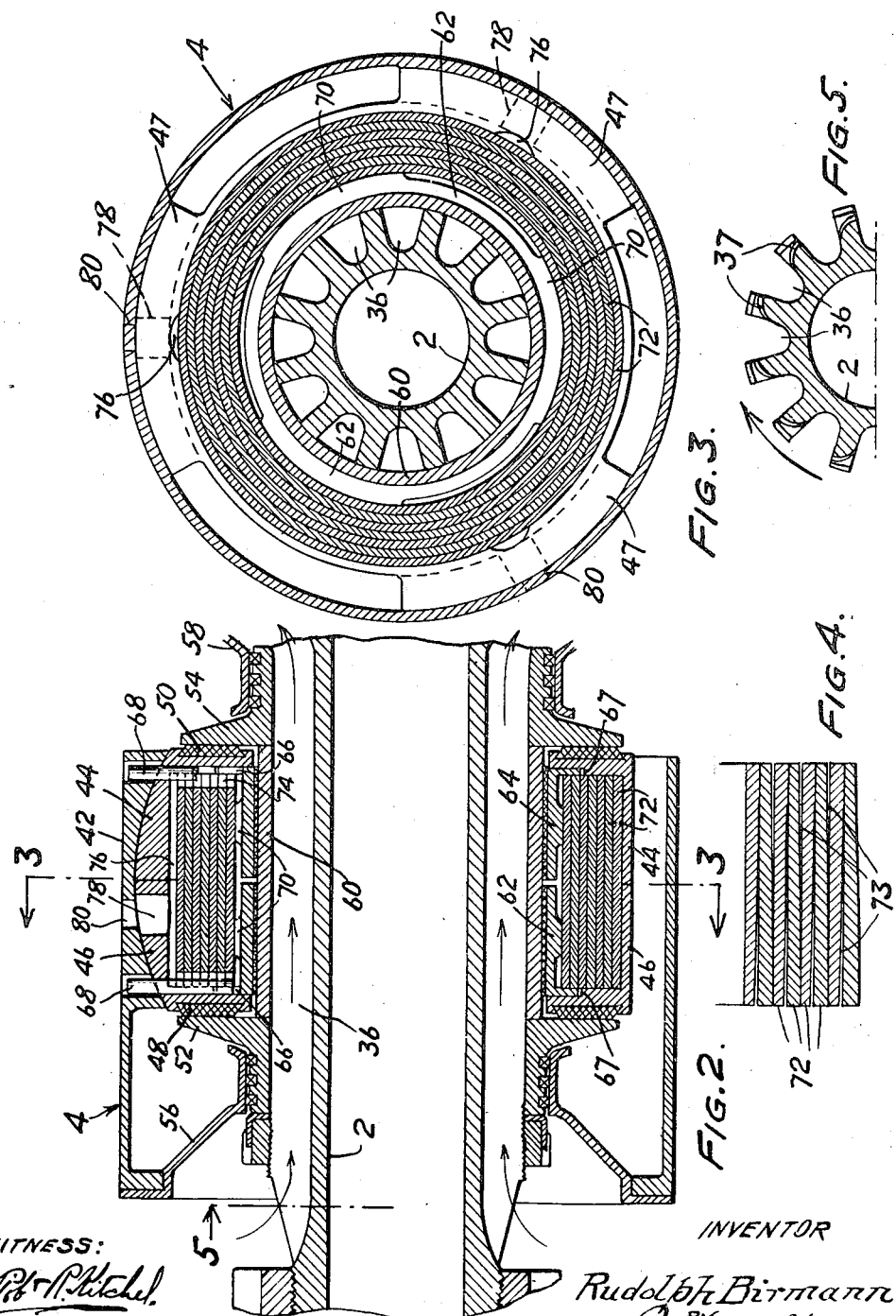

Patented May 4, 1948

2,440,890

UNITED STATES PATENT OFFICE 2,440,890

TURBINE BEARING

Rudolph Birmann, Newtown, Pa., assignor, by mesne assignments, to Turbo Engineering Corporation, a corporation of Delaware Application January 3, 1941, Serial No. 372,966

10 Claims. (Cl. 308—77)

This invention relates to a turbine, and has particular reference to high speed turbines driven by hot gases such as products of combustion. Specifically, the invention relates to a bearing construction for such turbine, permitting operation at or above the critical speed of the turbine shaft and under conditions of high rotor temperature.

In order to have the minimum surfaces subjected to heat and distortion, and to obtain the highest possible efficiency, gas turbines must be designed to operate at the highest feasible speeds. This makes the use of stiff shafts impractical, and flexible shafts must be resorted to. While the critical speed of a stiff shaft lies above its maximum operating range, a flexible shaft has its critical speed below its possible operating speed. A gas turbine, and particularly an exhaust gas turbine for driving a supercharger, may have to operate at all speeds from zero to the highest permissible speed, and may, therefore, operate for substantial periods at the first or at some higher order critical speed.

With conventional bearing constructions, continuous operation at a critical speed is dangerous, inasmuch as it is likely to result in the complete destruction of the unit. In accordance with the present invention, there is provided a bearing which is resilient in such manner that it permits the shaft to revolve at all times around its true center of gravity, and thereby eliminates the reasons for the phenomena arising at critical speed. These phenomena are well known and discussed in texts, and need not be gone into here. It is sufficient to state that at a critical speed stresses of dangerous and destructive magnitude are likely to be set up.

Theoretical considerations and practical experience have demonstrated that mere resiliency of a bearing is not sufficient to eliminate critical speed effects, but that it is necessary to combine with the flexibility of the bearing a substantial damping action. As indicated in my Patent 1,926,225, flexibility and damping capacity for a high speed bearing may be obtained by means of a series of freely rotating sleeves made alternately of steel and lead bronze. These sleeves were so made and provided with suitable oil holes and grooves that during operation an oil film of substantial thickness was maintained between the sleeves. Since, as is known from the oil film theory of bearing lubrication, a dynamically maintained oil film can undergo considerable changes in thickness, it is obvious that the multiple oil films existing between the several sleeves permit the necessary radial resiliency. Furthermore, these multiple oil films, by reason of fluid friction, are capable of absorbing vibratory motion and thereby accomplish the required damping. The design referred to has been very successfully used, but since it involves a very high centrifugal action on the oil, it is necessary to provide the oil through a shaft bore to the revolving sleeves. It further necessitates all sleeves being free to rotate, since this alone permits the oil films to be dynamically maintained.

Stationary sleeves having cylindrical inner and outer surfaces are impractical, since the slightest vibration causes the oil to be hammered out between the sleeves, resulting in metal to metal contact with accompanying loss of resiliency and damping action and failure of the bearing to perform as intended.

One object of the present invention is to provide a bearing satisfying the requirements indicated above in which the parts affording resiliency and damping action are not rotating so that oil feed through the high speed shaft is unnecessary. Briefly stated, the bearing comprises sleeves as in the form just described, but spaces are maintained between them so that oil films are provided by capillary action rather than by a dynamic action due to rotation, and hence the sleeves may be stationary.

A further object of the invention is the provision of means for effecting cooling of the bearing. In order to secure proper shaft support, it is necessary that the bearing be close to the turbine rotor, particularly when the rotor is of the most desirable over-hung type. The rotor during operation is heated to a very high temperature and protection of the bearing from this temperature is necessary. In my Patent 2,216,731, dated October 8, 1940, I have illustrated a method of accomplishing this cooling by providing a hollow shaft into which cooling air may enter and from which it is discharged between the rotor and adjacent bearing through a series of radially directed openings having an impeller action. For extremely high temperature turbine wheels, this arrangement is not adequate, particularly when a wheel must be mounted very close to the bearing. If the shaft is made of sufficient strength and rigid, its wall thickness becomes rather substantial and large quantities of heat are transferred by conduction directly through the thick walls of the shaft and heat thus flowing cannot be absorbed rapidly enough by the cooling air flow induced within the hollow shaft, because of the limited heat exchange surface which is available.

A further object of the present invention is, therefore, the provision of an arrangement in which air is not caused to flow through the shaft, but through grooves at the shaft periphery, where it is surrounded by the bearing. While the shaft may still be hollow for lightening purposes, it need not conduct any air or, if it does, that air gives purely auxiliary cooling effects and is not depended upon for the protection of the bearing.

The above and further objects of the invention relating particularly to details, will be apparent from the following description, read in conjunction with the accompanying drawing, in which:

Figure 2 is an enlarged sectional view showing details of the bearing construction;

Figure 3 is a transverse section taken on the plane indicated at 3—3 in Figure 2;

Figure 4 is an enlarged diagrammatic section showing the nature of the nested sleeves used in the bearing; and Figure 5 is a fragmentary section taken on the plane indicated at 5—5 in Figure 2.

Figure 1:
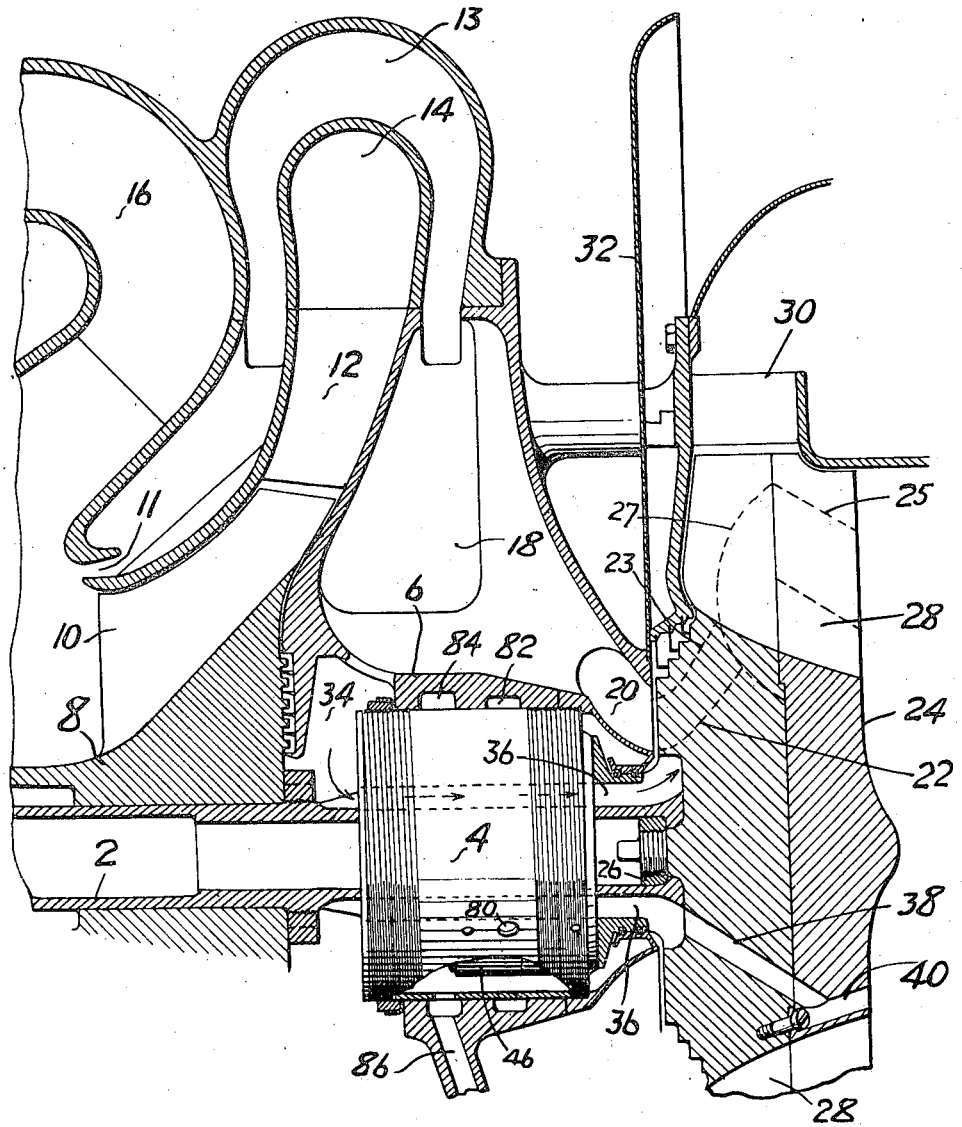
Figure 1 is a fragmentary axial section through the turbine-compressor unit embodying the inventions.

The mechanism illustrated is similar to that shown, for example, in my prior Patents 1,926,225 and 2,216,731, referred to above. It comprises a hollow shaft 2 mounted in a bearing, indicated generally at 4, carried in a bore in a portion 6 of the frame of the machine. To the left of the bearing the shaft carries one or more impellers, the last stage impeller being indicated at 8 as provided with passages 10 receiving air, for example, from the discharge passage 16 of a preceding stage to discharge compressed air through diffuser blades 12 into a volute 14. From this volute the air passes to an engine to be supercharged or to some other point of use. Air for cooling purposes is bled off between the stages at 11 and flows by way of one or more connecting passages 13 into an annular chamber 18, from which some of the air passes through the passage portion 20 to air passages 22 provided in the turbine rotor 24. These passages are arranged to provide cooling, and by their use recovery of energy is effected as described in detail in my application Serial No. 176,979, filed November 29, 1937, now matured into Patent Number 2,283,176. They may take the form described in said application being provided by drilled portions 23 and 25 and milled portions 27. The rotor 24 is secured to the shaft as indicated at 26, and is provided with turbine buckets 28 receiving gas at ...gh temperature from the peripheral nozzles 30. A baffle 32 may be provided to prevent radiation of heat to a substantial extent from the turbine housing to the compressor portion of the unit.

Some of the air from the chamber 18 passes through the connecting region 34 and thence through external grooves 36 provided in the shaft 2, finally being discharged through passages 38 and 40 in the turbine rotor, provided, for example, in the form of drilled holes between the main cooling passages 22 inwardly of the buckets 28. These drilled holes may follow proper generating straight lines similar to those of the passages 22, as described in my said application Serial No. 176,979. As illustrated in Figure 5, the entrance portions of these grooves 36 are shaped as indicated at 37 to reduce shock at their entrance portions.

Referring particularly to Figures 2 and 3, the bearing construction will now be described. The bearing comprises an outer member 42, which is secured within, and in effect forms a part of, the portion 6 of the casing previously referred to. This member 42 is provided with a plurality of interior spherical faces providing a bearing for similar spherical faces (three in number) 47, provided on elements 44 and 46 constituting, in effect, a single inner member of the bearing, but made separate for purposes of assembly. The elements 46 and 44 are provided with bearing rings 48 and 50, adapted to take endwise thrusts of collars 52 and 54 secured to the periphery of the shaft 2 about the grooves 36 and rotating with the shaft. Members 56 and 58, secured to the member 4 and to the frame portion 6, respectively, hold stationary oil seal rings which engage with grooves in the hubs of thrust collars 52 and 54, thus providing a closed lubricant chamber surrounding the various bearing, and relatively moving, surfaces.

A sleeve 60, also secured to the shaft 2, spaces the collars 52 and 54 and provides on its exterior a bearing surface contacting the babbitted inner surfaces of members 62 and 64. These latter members are provided with radially extending flanges 66, the edges of which, having slight clearance, as indicated at 67, with annular bores of elements 46 and 44 limit radial displacement of the bearing. The flanges 66 are also provided with openings into which project pins 68, which project also through openings in the member 42 and the respective elements 44 and 46, thereby preventing relative rotations of these various parts. The pins fit the openings in member 42 loosely, however, so as to permit tilting of the shaft and the inner elements of the bearing relative to member 42.

The members 62 and 64 are provided with circumferentially extending pads 70 supporting internally the bundle of nested sleeves 72 to which further reference will be made hereafter. These sleeves fill the space between the pads 70 and the inner surfaces of the elements 44 and 46. These latter surfaces are provided with oil grooves, indicated at 76, communicating with radially extending openings 78 and 80 in element 46 and member 42, respectively. The openings 80 in turn communicate with an annular groove 82 in the frame portion 6, to which pressure oil is supplied. A second groove 84 receives oil from the drain spaces of the bearing housing and communicates through passage 86 with the scavenging oil pump which withdraws the oil.

The nature of the sleeves 72 is illustrated to a somewhat distorted scale in Figure 4. Each sleeve is provided with a cylindrical inner surface. A portion of its outer surface at one end is also cylindrical to fit quite closely the inner surface of the next larger sleeve. The remaining portion of the outer surface of each, however, is tapered as indicated at 73, so as to provide a wedge-shaped annular space having a maximum depth of several thousandths of an inch. In assembly, these sleeves are arranged with their portions of maximum diameter alternating as illustrated in Figure 4, from which it will be evident that an assembly is provided capable of a springing action between the inner and outer surfaces of the bundle due to slight deflections of the sleeves. The arrangement is also obviously such that not only is springing possible if the stresses are applied in strictly radial directions, but a resiliency to tilting is also afforded. Thus even aside from the arrangement of spherical surfaces previously described, the bundle of sleeves provides some self-aligning characteristics.

The sleeves of the bundle are prevented from rotating relatively to each other by the provision of notches in their edges as illustrated in Figure 2 embracing the pins 68.

In the operation of the improved bearing arrangement, it will be evident that little restraint is exerted by the bearing to cause the shaft to rotate about its geometrical axis, so that well below its critical speed it will revolve about its true center of gravity with the result that the phenomena associated with the reaching of critical speed will not appear. The construction of the sleeves referred to above provides substantial resiliency. At the same time, however, the oil in the tapered spaces between the sleeves provides a high degree of damping, so that there are no tendencies to build up vibrations. The damping occurs due to the change of volume of the spaces between the sleeves and the friction resulting from the consequent flow of the oil film. In view of the fact that the sleeves are stationary, oil may be freely fed radially inward, since it has no centrifugal force to overcome. While in the specific modification of the invention illustrated, a thrust bearing is shown, it will be obvious that the invention is equally applicable to a plain journal. The necessity for the provision of a spherical mounting may not always arise, since the sleeves provide by their resiliency, in view of the tapered spacing, a substantial capability of universal movement.

The flow of air through the slots at the exterior of the shaft prevents any rise of temperature of the bearing to a dangerous extent. In the form of the invention illustrated, the flow of air may be considered partially due to pressure existing in the passage 34 and partially due to flow induced by the impeller action of the passage 38. Depending on the type of mechanism, the flow of air may be provided either by such combination, solely by pressure at the inlets to the slots, or solely by an impeller or ejector action at the outlets. The flow of air should be at quite high velocity to produce thoroughly effective cooling. Utilizing the principles of my application Serial No. 176,979, referred to above, the energy imparted to this cooling air need not be lost, but may be substantially recovered in connection with heating and expansion in the rotor.

What I claim and desire to protect by Letters Patent is:

1. In combination, a high speed shaft, a casing, a member mounted in said casing for limited tilting movements relative thereto, and a bundle of non-rotatable nested sleeves within said member and mounting said shaft, said sleeves having tapered spaces between them to contain capillary films of oil, various pairs of adjacent sleeves having their closest portions at different axial positions so that the bundle of sleeves has radial flexibility through variations in the tapered spaces between the sleeves.

2. In combination, a high speed shaft, a casing, and a bundle of nested sleeves mounted in the casing and mounting said shaft, adjacent pairs of nested sleeves having close portions and spaced portions, the latter providing spaces between them for capillary films of oil, the close portions of various pairs being at different axial positions so that the bundle of sleeves has radial flexibility through variations in the oil-containing spaces.

3. In combination, a high speed shaft, a casing, and a bundle of nested sleeves mounted in the casing and mounting said shaft, adjacent pairs of nested sleeves having close portions and spaced portions, the latter providing tapered spaces between them for capillary films of oil.

4. In combination, a high speed shaft, a casing, and a bundle of nested sleeves mounted in the casing and mounting said shaft, adjacent pairs of nested sleeves having close portions and spaced portions, the latter providing tapered spaces between them for capillary films of oil, the close portions of various pairs being at different axial positions so that the bundle of sleeves has radial flexibility through variations in the oil-containing spaces.

5. In combination, a high speed shaft, a casing, a bundle of nested sleeves mounted in said casing and mounting said shaft, and means for supplying oil to said bundle of sleeves to provide oil films between them, said shaft having axially extending passages adjacent to the periphery thereof surrounded by said sleeves for the passage of cooling air to reduce transfer of heat from the shaft to the sleeves.

6. In combination, a high speed shaft, a casing, a bundle of nested sleeves mounted in said casing and mounting said shaft, means for supplying oil to said bundle of sleeves to provide oil films between them, said shaft having axially extending passages adjacent to the periphery thereof surrounded by said sleeves for the passage of cooling air to reduce transfer of heat from the shaft to the sleeves, and means for providing flow of cooling air through said passages.

7. In combination, a high speed shaft, a casing, and a bundle of nested sleeves mounted in the casing and mounting said shaft, adjacent pairs of nested sleeves having close portions and spaced portions, the latter having areas substantially exceeding the areas of the close portions, having varying clearances during operation, and being arranged to receive between them capillary films of oil, so that damping of radial deflections of said shaft occurs during operation due to flow of oil between said spaced portions of the sleeves.

8. In combination, a high speed shaft, a casing and a bundle of nested sleeves mounted in the casing and mounting said shaft, adjacent pairs of nested sleeves having close portions and spaced portions, the latter having varying clearances during operation, and being arranged to receive between them capillary films of oil, so that damping of radial deflections of said shaft occurs during operation due to flow of oil between said spaced portions of the sleeves.

9. In combination, a high speed shaft, a casing, and a bundle of nested sleeves mounted in the casing and mounting said shaft, each of at least certain pairs of adjacent sleeves of said bundle having at least one region of contact with each other and being separated throughout substantial areas to provide oil spaces, the regions of contact of the inner and outer surfaces of each sleeve being substantially out of radial alignment, so that relative flexure of the sleeves may occur due to radially exerted pressures.

10. In combination, a high speed shaft, a casing, and a bundle of nested sleeves mounted in the casing and mounting said shaft, at least certain pairs of said sleeves having localized contact with each other and being separated throughout substantial areas to provide oil spaces, the regions of such localized contact of the inner and outer surfaces of at least some of said sleeves being substantially out of radial alignment, so that relative flexure of the sleeves may occur due to radially exerted pressures.

RUDOLPH BIRMANN.

REFERENCES CITED

The following references are of record in the file of this patent:

UNITED STATES PATENTS

| Number | Name | Date |
|---|---|---|
| 298,279 | Gray | Oct. 23, 1883 |
| 1,111,342 | Williams | Sept. 22, 1914 |
| 1,310,672 | Sherbondy | July 22, 1919 |
| 1,352,303 | Mitchell | Sept. 7, 1920 |
| 1,378,559 | Roberts | May 17, 1921 |
| 1,382,388 | Granier | June 21, 1921 |
| 1,463,018 | Junggren | July 24, 1923 |
| 2,226,910 | Rice | Dec. 31, 1940 |

FOREIGN PATENTS

| Number | Country | Date |
|---|---|---|
| 311,674 | Great Britain | May 10, 1929 |